US009630796B2

(12) United States Patent
Menta et al.

(10) Patent No.: US 9,630,796 B2
(45) Date of Patent: Apr. 25, 2017

(54) TAPE CARTRIDGE

(75) Inventors: William J. Menta, West Wyoming, PA (US); Bryce J. Fox, Honesdale, PA (US)

(73) Assignee: SIGNODE INDUSTRIAL GROUP LLC, Glenview, IL (US)

( * ) Notice: Subject to any disclaimer, the term of this patent is extended or adjusted under 35 U.S.C. 154(b) by 1282 days.

(21) Appl. No.: 13/350,359

(22) Filed: Jan. 13, 2012

(65) Prior Publication Data

US 2012/0232699 A1 Sep. 13, 2012

Related U.S. Application Data

(60) Provisional application No. 61/451,733, filed on Mar. 11, 2011.

(51) Int. Cl.

*B29C 65/00* (2006.01)
*B65H 35/00* (2006.01)
*B65B 51/06* (2006.01)
*B31B 3/00* (2006.01)

(52) U.S. Cl.

CPC ........... *B65H 35/0013* (2013.01); *B31B 3/00* (2013.01); *B65B 51/067* (2013.01); *B65H 2601/25* (2013.01); *Y10T 83/889* (2015.04); *Y10T 83/9461* (2015.04); *Y10T 156/12* (2015.01)

(58) Field of Classification Search

None
See application file for complete search history.

(56) References Cited

U.S. PATENT DOCUMENTS

| | | | | |
|---|---|---|---|---|
| 3,892,618 | A * | 7/1975 | Griebat | 156/355 |
| 3,915,786 | A | 10/1975 | Collett et al. | |
| 3,954,550 | A | 5/1976 | Patterson | |
| 4,295,771 | A * | 10/1981 | Mehesan, Jr. | 414/5 |
| 4,781,786 | A * | 11/1988 | Lerner et al. | 156/468 |
| 5,066,346 | A * | 11/1991 | Long et al. | 156/157 |
| 5,173,140 | A * | 12/1992 | Vasilakes | 156/212 |
| 5,454,776 | A * | 10/1995 | Ulrich et al. | 493/117 |
| 8,079,395 | B2 * | 12/2011 | Fox et al. | 156/526 |
| 2009/0217535 | A1 * | 9/2009 | Fox et al. | 30/275.4 |
| 2009/0218047 | A1 | 9/2009 | Fox et al. | |
| 2009/0218048 | A1 | 9/2009 | Fox et al. | |

FOREIGN PATENT DOCUMENTS

| | | | |
|---|---|---|---|
| CN | 201424150 | Y | 3/2010 |
| CN | 201424151 | Y | 3/2010 |
| CN | 101804924 | A | 8/2010 |

OTHER PUBLICATIONS

International Search Report for PCT/US2012/028226 dated Jun. 11, 2012.

* cited by examiner

*Primary Examiner* — Robert Fennema
*Assistant Examiner* — MD N Mia
(74) *Attorney, Agent, or Firm* — Levenfeld Pearlstein, LLC

(57) ABSTRACT

A cutting mechanism assembly for use with a tape cartridge includes a support arm having first and second opposing ends and adapted to be coupled to the tape cartridge. The cutting mechanism assembly also includes a mount for a biasing element. The mount is coupled to the support arm and the biasing element is configured to couple the mount to the tape cartridge. Further, the cutting mechanism assembly includes a support plate for a mechanism for reducing a biasing force from the biasing element. The support plate is coupled to the support arm and the mechanism is configured to couple the support plate to the tape cartridge.

17 Claims, 6 Drawing Sheets

TAPE CARTRIDGE

CROSS-REFERENCE TO RELATED APPLICATION DATA

This application claims the benefit of priority of Provisional U.S. Patent Application Ser. No. 61/451,733, filed Mar. 11, 2011, the entirety of which is incorporated herein by reference.

BACKGROUND OF THE DISCLOSURE

Tape cartridges can be utilized to apply a packing tape, such as pressure sensitive tape, to a surface of a case or box to be sealed. In one example, the tape cartridge rides on a surface of the case, such as a top and/or bottom surface, generally along a seam formed between opposing flaps of the case that are folded over. The tape cartridge applies packing tape along the seam as the case is conveyed past the tape cartridge to seal the case. The tape cartridge may include a front application roller arm assembly for applying the packing tape to a front surface and the top/bottom surface of the case, a cutting mechanism for cutting or severing the tape as the case is conveyed past the tape cartridge, and a rear application roller arm assembly for wiping a tail end or tab of the severed packing tape onto a rear surface of the case.

In one example of the tape cartridge in use, the front application roller arm assembly engages a leading front surface of the box and tape is applied thereto. The box travels past the tape cartridge and the front application roller arm assembly rotates inward or retracts towards the tape cartridge to ride on the top surface of the box to apply tape thereto. The cutting mechanism also retracts inward towards the tape cartridge and rides on the top surface of the box as it passes thereby. According to one example, the front application roller arm assembly and the rear application roller arm assembly are coupled together to rotate inwardly toward one another as the box first engages the front application roller arm assembly.

In the present example, the box continues to travel past the tape cartridge until the box clears the cutting mechanism at which time the cutting mechanism travels back to its home position to sever a tail end or tab of the tape. Further, the box travels past the rear application roller arm assembly, which rotates down and outward to its original position to wipe the tail end of the severed tape against the rear surface of the box as the box passes thereby. The cutting mechanism is biased, such as by a spring, with sufficient force to ensure that the cutting mechanism cuts the tape consistently as the box is moving away from the tape cartridge. The front and rear application roller arm assemblies are also biased, such as by a spring, with sufficient force to ensure that tape is applied to the front and top surfaces of the box and that the tail end of the severed tape is wiped against the rear panel of the box as the box moves away from the tape cartridge.

One issue with known tape cartridges is that the biasing force required for the proper operation of the front application roller arm assembly, the rear application roller arm assembly, and/or the cutting mechanism may cause such components to push through or otherwise damage a surface of the box as they come into contact therewith. Consequently, the damaged box may have to be discarded and the contents of the box repackaged, which results in decreased throughput speeds. The likelihood of such damage occurring is increased when there is a void between the contents of the box and the box itself. In this case, the integrity of the typically corrugated cardboard sidewalls of the box provides the only support for the tape cartridge. Generally, packing and distribution centers have the option of filling voids in the box with dunnage or similar offerings to provide support for the tape cartridge. However, such practice is often curtailed to generate savings in material cost and production time. Further, the use of lesser quality boxes, such as recycled boxes, may also adversely affect the integrity of the boxes and increase the likelihood of the tape cartridge damaging the box.

Accordingly, there is a need for improvements to tape cartridges to address one or more of the above issues of damaging cases to be sealed and decreased throughput speed.

SUMMARY OF THE DISCLOSURE

According to one example, a cutting mechanism assembly for use with a tape cartridge includes a support arm having first and second opposing ends and is adapted to be coupled to the tape cartridge. The cutting mechanism assembly also includes a mount for a biasing element. The mount is coupled to the support arm and the biasing element is configured to couple the mount to the tape cartridge. Further, the cutting mechanism assembly includes a support plate for a mechanism for reducing a biasing force from the biasing element. The support plate is coupled to the support arm and the mechanism is configured to couple the support plate to the tape cartridge.

According to another example, a tape cartridge includes a mounting plate and a cutting mechanism assembly. The cutting mechanism assembly further includes a support arm movably coupled to the mounting plate, a biasing element coupled between the support arm and the mounting plate, and a mechanism for reducing a biasing force from the biasing element. The mechanism for reducing a biasing force is coupled between the support arm and the mounting plate.

Another example is directed to a case processing system that includes a sensor for detecting the presence of a case to be sealed, a controller coupled to the sensor, and a tape cartridge coupled to the controller. The tape cartridge includes a cutting mechanism assembly, a biasing element for biasing the cutting mechanism assembly to a first position, and a mechanism for reducing a biasing force from the biasing element. In response to the sensor detecting the case, the controller actuates the mechanism to reduce the biasing force from the biasing element and, in response to the sensor no longer detecting the case, the controller de-actuates the mechanism to allow the biasing force to return the cutting mechanism assembly to the first position.

BRIEF DESCRIPTION OF THE DRAWINGS

Details of the present disclosure, including non-limiting benefits and advantages, will become more readily apparent to those of ordinary skill in the relevant art after reviewing the following detailed description and accompanying drawings, wherein.

DETAILED DESCRIPTION

Figure 1:
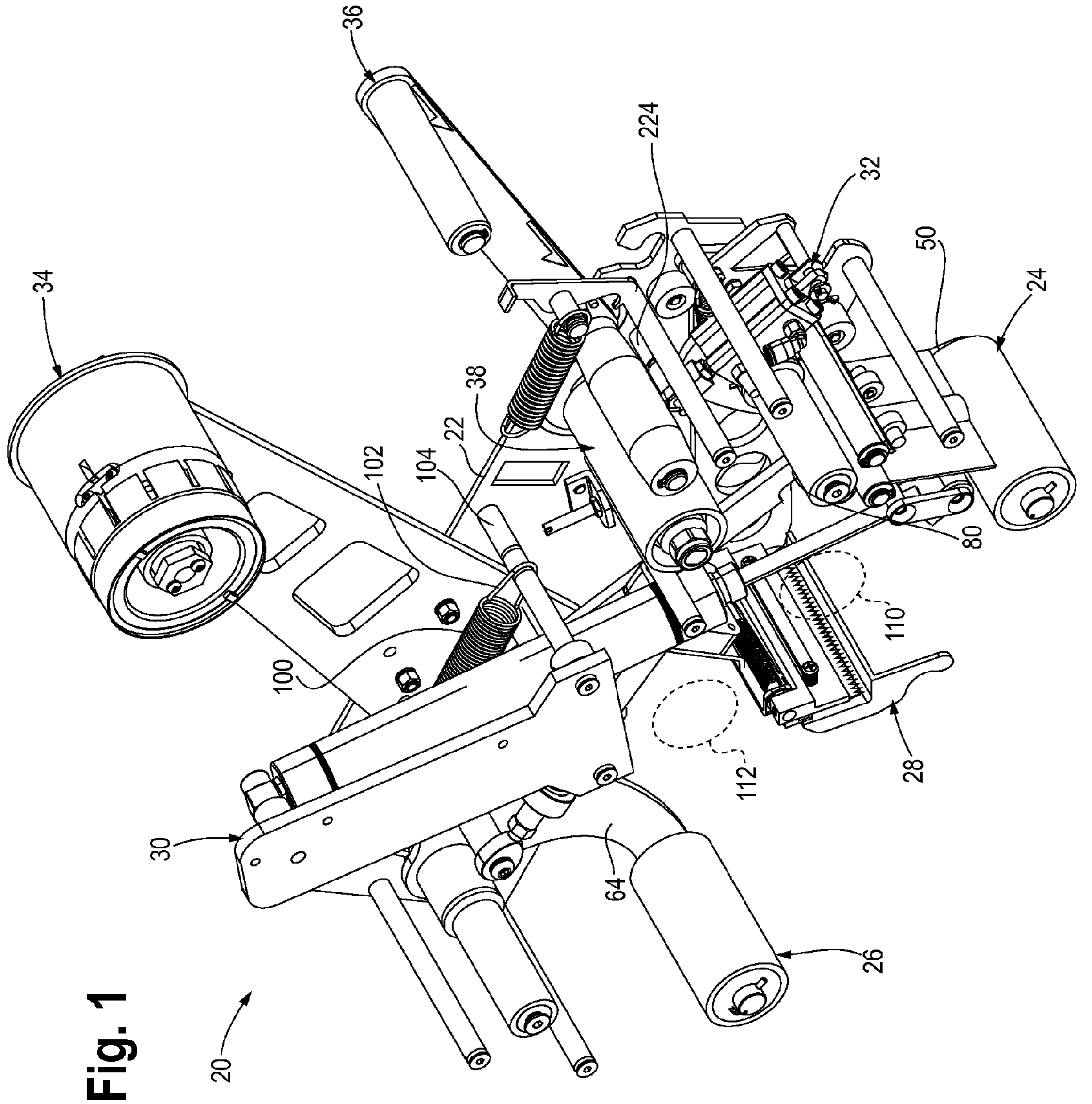
FIG. 1 is an isometric view of a tape cartridge according to one example.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or shown.

Referring now to FIGS. 1-6, a tape cartridge 20 is shown that includes a main mounting plate 22 to which are mounted, directly or indirectly, a front application roller arm assembly 24, a rear application roller arm assembly 26, and a cutting mechanism or knife assembly 28. A first mechanism 30 for reducing a biasing force is coupled to the front application roller arm assembly 24 and a second mechanism 32 for reducing a biasing force is coupled to the cutting mechanism assembly 28. In addition, a tape core assembly 34, a tape tension arm assembly 36, and a tension roller assembly 38 are coupled to the main mounting plate 22.

In the present disclosure, directional terms, such as front, rear, up, down, upper, lower, top, bottom, left, right, central, etc. are generally used for non-limiting reference purposes only. The tape cartridge will be generally discussed herein as being configured to apply tape to a top surface of a case or box, it being understood that the tape cartridge could be configured to apply tape to other surfaces of the case without departing from the spirit and scope of the present disclosure. Further, terms that refer to mounting methods, such as coupled, mounted, connected, etc., are not intended to be limited to direct mounting methods but should be interpreted broadly to include indirect and operably coupled, mounted, connected and like mounting methods.

Figure 2:
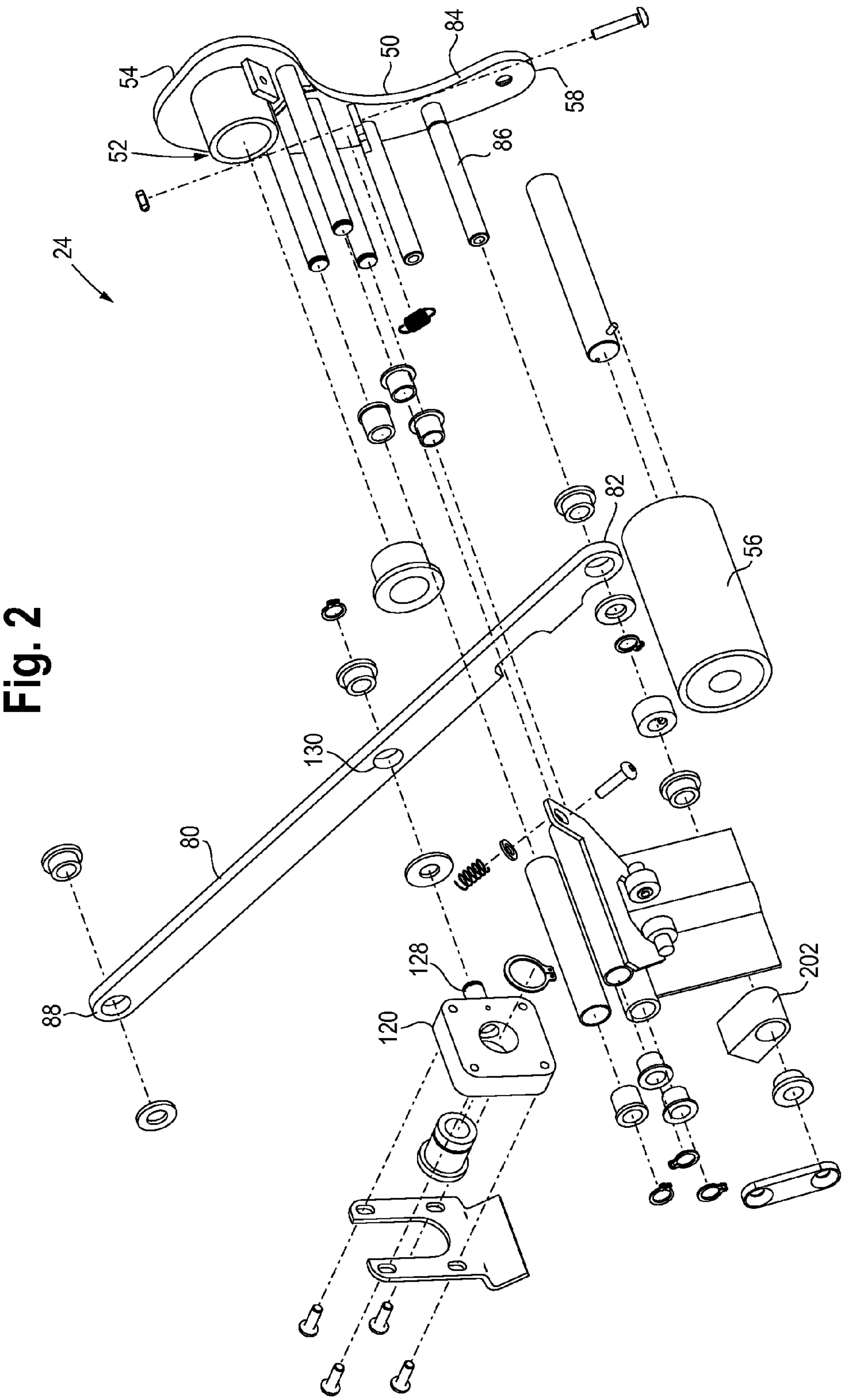
FIG. 2 is an exploded isometric view of a front application roller arm assembly of the tape cartridge of FIG. 1.
Figure 3:
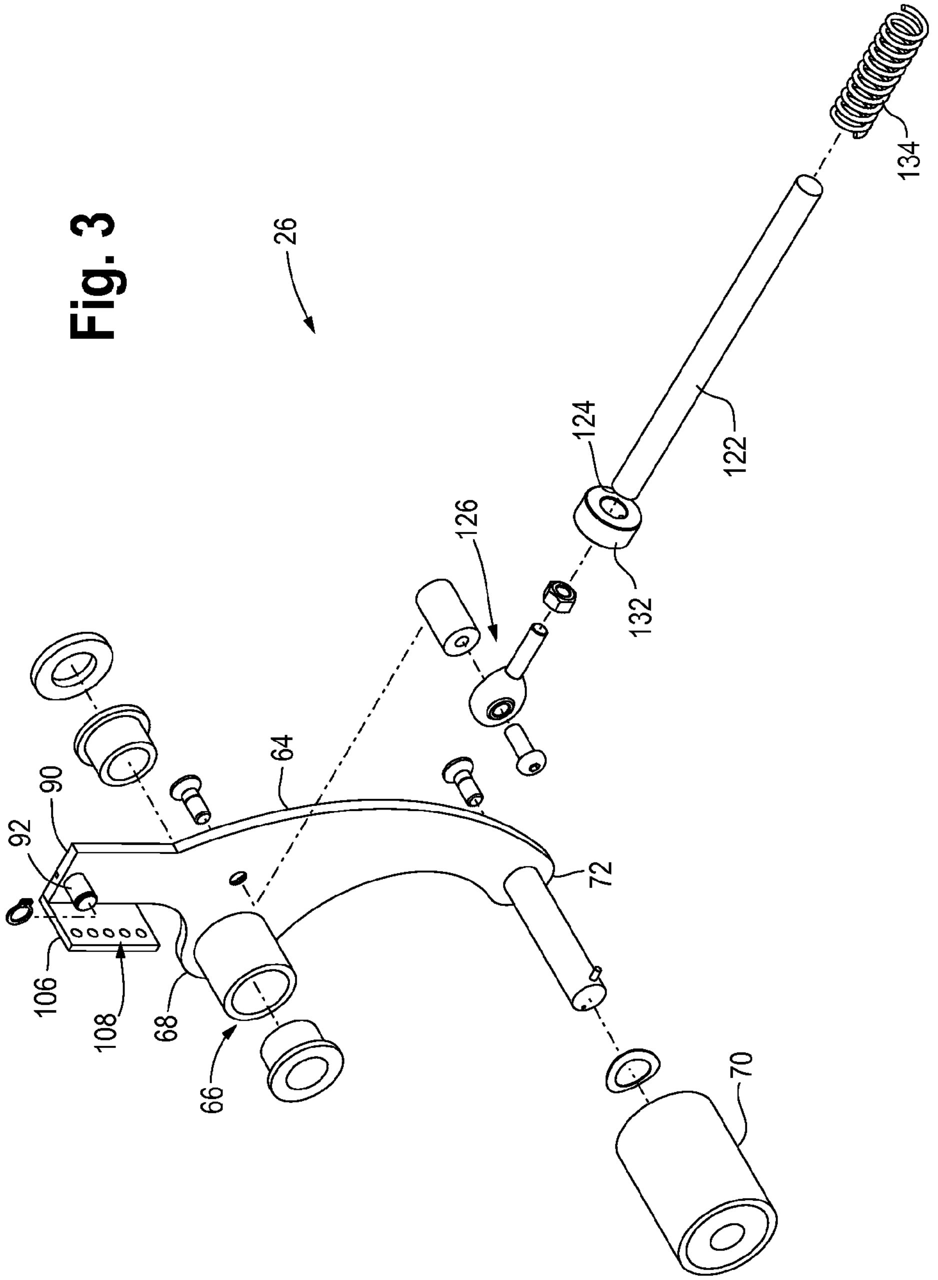
FIG. 3 is an exploded isometric view of a rear application roller arm assembly of the tape cartridge of FIG. 1.

Referring more particularly to FIGS. 1-3, the front application roller arm assembly 24 includes a front application roller arm 50 pivotally mounted to the main mounting plate 22 by a first pivot pin assembly 52 proximate an upper end portion 54 of the front application roller arm. A front tape application roller 56 is disposed proximate a lower end portion 58 of the front application roller arm 50. The rear application roller arm assembly 26 includes a rear application roller arm 64 pivotally mounted to the main mounting plate 22 by a second pivot pin assembly 66 proximate an upper central portion 68 of the rear application roller arm. A rear tape application roller 70 is disposed proximate a lower end portion 72 of the rear application roller arm 64. According to the present example, the front tape application roller 56 is configured to apply a sealing tape to front and top/bottom surfaces of a case or box and the rear tape application roller 70 is configured to apply or wipe a severed tab portion of the sealing tape to a rear surface of the case.

A link bar 80, shown more clearly in FIG. 2, operatively connects the front and rear application roller arms 50, 64. More particularly, the link bar 80 has a first end 82 thereof pivotally connected generally proximate to a lower central portion 84 of the front application roller arm 50 at a pin 86. A second opposing end 88 of the link bar 80 is pivotally connected generally proximate to an upper end portion 90 of the rear application roller arm 64 at a pin 92, as seen more clearly in FIG. 3.

Further, a first biasing member 100, such as a coil spring, has a first end 102 engaged with a mounting pin 104 extending from the main mounting plate 22 and a second opposing end (not shown) adapted to be engaged with the rear application roller arm 64. Referring to FIG. 3, for example, the second end of the biasing member 100 may be engaged with a bracket 106 mounted proximal to the upper end portion 90 of the rear application roller arm 64. Spaced apart apertures 108 defined in the bracket 106 permit the tension of the first biasing member 100 to be operably adjusted as desired.

In one example of the tape cartridge 20 in normal use, a leading end tab portion of sealing tape is routed, for example, from a roll of tape disposed on the tape core assembly 34, around the tension roller assembly 38, and around the front tape application roller 56, as would be apparent to one of ordinary skill in the art. Generally, the tape tension arm assembly 36 rests against the roll of tape to provide tension thereto. More particularly, the leading end tab portion of sealing tape is routed around the front tape application roller 56 so that an adhesive side of the sealing tape is oriented outwardly to contact a front surface of a case or box that engages the roller. When the front tape application roller 56 mounted upon the front application roller arm 50 encounters the front surface of the case to be sealed, the arm and roller are initially pushed thereby toward the left, as viewed within FIG. 1. As the case continues to move past the tape cartridge 20 and push the front tape application roller 56, the front application roller arm 50 pivots about the first pivot pin assembly 52 in a clockwise direction. Consequently, the front tape application roller 50 will effectively be moved along an arcuate path from its original or start position, as illustrated in solid lines in FIG. 1, to an end of movement position, as is illustrated by dotted lines 110 in FIG. 1.

Simultaneously therewith, the rear application roller arm 64 will be pivotally moved in a counterclockwise direction about its pivot axis defined by the second pin assembly 66 due to the interconnection between the front application roller arm 50 and the rear application roller arm by means of the link bar 80. In this manner, the upper end portion 90 of the rear application roller arm 64 will be moved toward the left as viewed within FIG. 1 while the lower end portion 72 of the rear application roller arm will be moved toward the right as viewed within FIG. 1. Consequently, the rear tape application roller 70 will effectively be moved along an arcuate path from its original or start position, as illustrated in solid lines in FIG. 1, to an end of movement position, as is illustrated by dotted lines 112 in FIG. 1. In this manner, when the front and rear application roller arms 50, 64 are pivotally moved from their original positions to the end of movement positions 110, 112, the first biasing member 100 will be expanded and urge the front and rear application roller arms back to their original positions once the case has passed thereby.

Referring again more particularly to FIGS. 2 and 3, a slide block 120 is movably mounted upon a guide rod 122, which includes a first end 124 pivotally connected proximate the upper central portion 68 of the rear application roller arm 64 via a third pivot pin assembly 126. The slide block 120 is pivotally connected to the link bar 80 by a pivot pin 128 that projects therefrom and is configured to be disposed within an aperture 130 defined within the link bar. In addition, a stop member 132, such as a washer, is disposed upon the guide rod 122 and a second biasing member 134, such as a coil spring, is disposed upon the guide rod between the stop member and the slide block 120. In one example, the stop member 132 is fixedly secured at a predetermined location upon the guide rod 122 and the second biasing member 134 is fixedly disposed on the stop member, such as by having one or more coils thereof being operatively engaged with the stop member.

In this manner, the slide block 120 is movable along the guide rod 122 from an original or start position that corresponds to the original or start positions of the front and rear application roller arms 50, 64, as illustrated generally in FIG. 1, to an end of movement position that corresponds with the angular or pivotal movements of the front and rear application roller arms to their end of movement positions 110, 112, as has been previously described. In the end of movement position, the slide block 120 is moved toward the left on the guide rod 122, as viewed within FIG. 1, and is disposed generally adjacent to the stop member 132. In this position, the second biasing member 134 will be compressed and exert an increased or enhanced amount of biasing force, pressure, or tension upon the rear application roller arm 64 to return to its original position. Such increased biasing force assists in the wiping of a severed tab portion of sealing tape to the rear surface of the case as the case is traveling away from the rear tape application roller 70.

Figure 4:
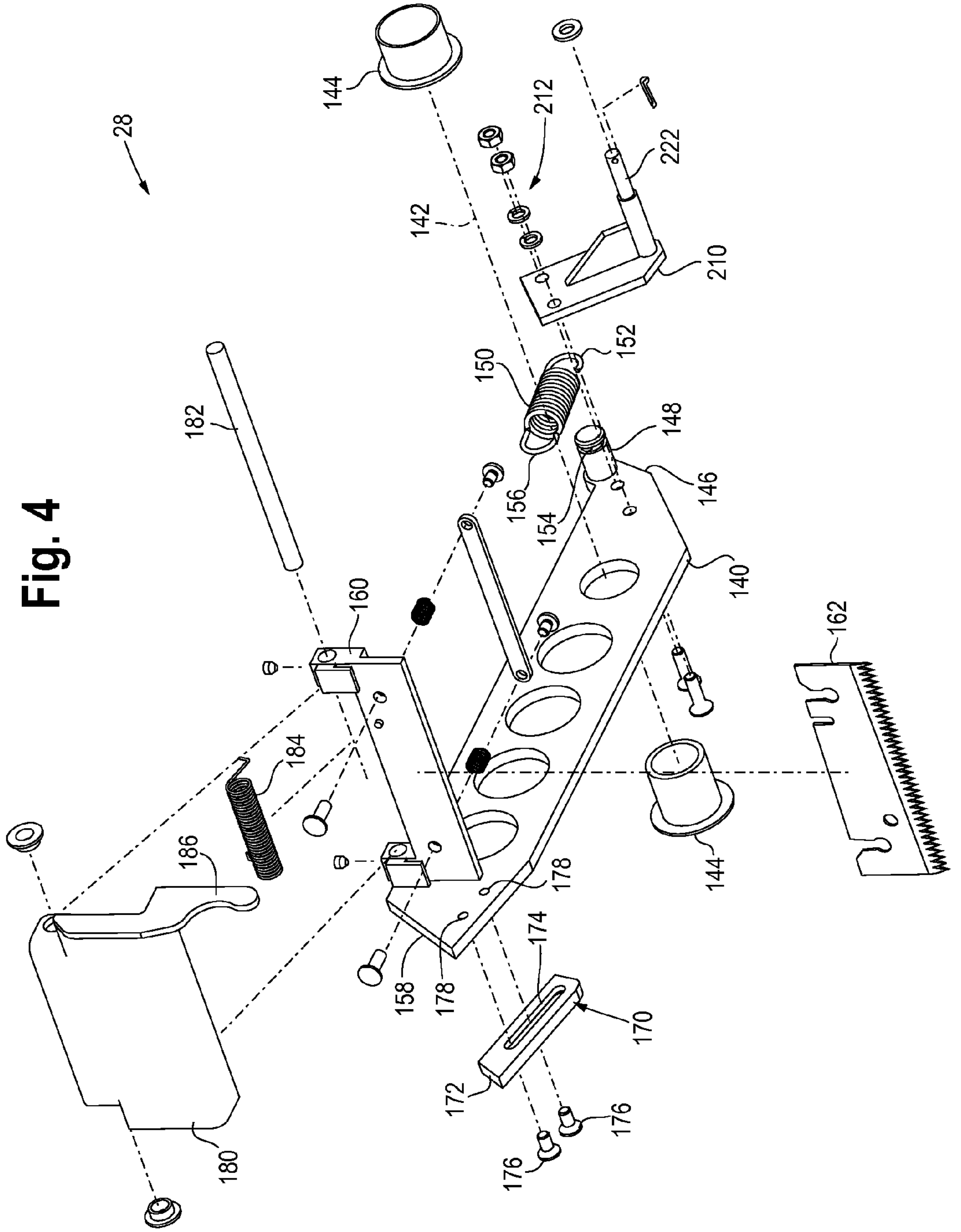
FIG. 4 is an exploded isometric view of a cutting mechanism assembly of the tape cartridge of FIG. 1.

Referring now more particularly to FIG. 4, the cutting mechanism assembly 28 includes a cutting mechanism support arm 140 adapted to be pivotally mounted to the main mounting plate 22 of the tape cartridge 20 around a transverse axis 142 defined by bushing members 144. A pin 146 extends from a forward end portion 148 of the cutting mechanism support arm 140. A third biasing member 150, such as a coil spring, has a first end 152 adapted to engage within a groove 154 of the pin 146 and a second opposing end 156 of the third biasing member is adapted to engage with a portion of the main mounting plate 22, such as another pin (not shown) extending from the main mounting plate. In this manner, when the cutting mechanism assembly 28 is coupled to the tape cartridge 20, the forward end portion 148 of the cutting mechanism support arm 140 is normally biased upwardly such that a rear end portion 158 thereof will normally be biased downwardly, as seen in FIG. 1.

In addition, a transversely oriented cutting mechanism mounting plate 160 is coupled to the cutting mechanism support arm 140. In one example, the mounting plate 160 is fixedly secured at one end thereof generally proximate to the rear end portion 158 of the cutting mechanism support arm 140. A knife blade or cutting mechanism 162 is adapted to be removably mounted upon the mounting plate 160 with a cutting surface thereof extending generally downwardly or away from the tape cartridge, as seen more clearly in FIG. 1.

A sealing tape adjustment mechanism 170 is also adapted to be movably mounted upon the rear end portion 158 of the cutting mechanism support arm 140. In one example, the sealing tape adjustment mechanism 170 comprises an elongated plate 172 having an elongated slot 174 defined therein. Fasteners 176 are adapted to be inserted through the elongated slot 174 and secured within apertures 178 defined within the rear end portion 158 of the cutting mechanism support arm 140. The adjustment mechanism 170 can be moved to adjust the length of the sealing tape tab cut by the cutting mechanism 162.

A cutting mechanism guard or cover 180 is adapted to be pivotally mounted upon the cutting mechanism support arm 140 between a first position where the cutting mechanism guard encloses or covers the cutting mechanism 162, as seen in FIG. 1, and a second position where the cutting mechanism guard uncovers or exposes the cutting mechanism to perform the sealing tape cutting operation. In the present example, the cutting mechanism guard 180 is mounted to the cutting mechanism support arm 140 on a pivot pin 182 having a fourth biasing member 184, such as a torsion spring, disposed thereon. The fourth biasing member 184 functions to bias the cutting mechanism guard 180 in the first position where the guard covers the cutting mechanism 162. The cutting mechanism guard 180 further includes a tab member 186 that extends therefrom.

In one example of the tape cartridge 20 in normal use, when a carton or case is conveyed past the tape cartridge to have sealing tape applied thereto, the front or forward surface and the top surface of the case will effectively force the downwardly biased rear end portion 158 of the cutting mechanism support arm 140 angularly upwardly against the biasing force of the third biasing member 150. The case will continue to move past the cutting mechanism support arm 140 such that the support arm is rotated to a generally horizontal orientation whereby a lower edge portion of the support arm rides on the top surface of the case. As the carton or case is conveyed past the cutting mechanism support arm 140, the front or forward surface and the top surface of the carton further contacts the tab member 186 to rotate the cutting mechanism guard 180 from the first position illustrated in FIG. 1 to an angularly displaced position to partially uncover the cutting member 162.

As a rear edge portion of the top of the case passes beyond the rear end portion 158 of the cutting mechanism support arm 140, the support arm will no longer be subjected to any upward pressure or force. Accordingly, the third biasing member 150 will bias or force the cutting mechanism support arm 140 to its original position whereby the forward end portion 148 of the support arm will move upwardly and the rear end portion 158 of the support arm will move downwardly. Simultaneously therewith, the tab member 186 of the cutting mechanism guard 180 is still engaged with the top of the case so that the cutting mechanism guard will be rotated still further in its opening or uncovering direction through a predetermined angular rotation to be disposed in the second position. The second position is, for example, 90° from the first covered position, whereby the cutting mechanism 162 is now fully uncovered and able to perform its sealing tape cutting operation. As the case continues past the cutting mechanism assembly 28 and the tab member 186 no longer contacts any portion of the case, the cutting mechanism 162 will move downwardly with the support arm 140 to sever a length of the sealing tape that defines a rear tab portion. Thereafter, the cutting mechanism guard 180 will return to its first position. The rear tab portion of sealing tape is adapted to be applied, such as by means of a wiping operation performed by the rear application roller arm 64 and roller 70, onto the vertically oriented rear surface of the case to effectively complete the carton or case sealing operation.

Figure 5:
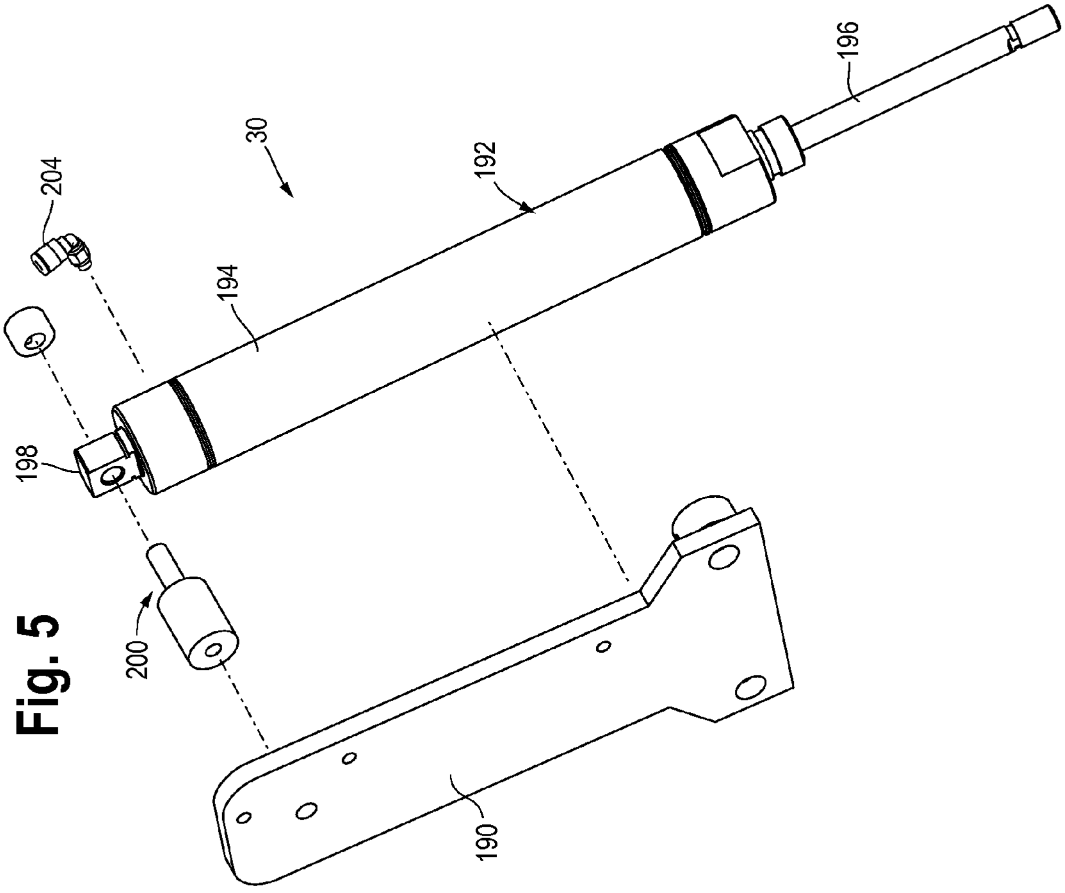
FIG. 5 is an exploded isometric view of an exemplary mechanism for reducing a biasing force on the front application roller arm assembly.

Referring now more particularly to FIGS. 1 and 5, the first mechanism 30 for reducing a biasing force includes a support plate 190 that is coupled to the main mounting plate 22 by one or more pins, such as the mounting pin 104. A first actuating element 192 is configured to be coupled to the support plate 190 and to the front application roller arm assembly 24. In one example, the actuating element 192 is a pneumatic cylinder 194 that utilizes compressed air to drive a piston rod 196 to move in and out of the pneumatic cylinder. In the present example, a first end 198 of the pneumatic cylinder 194 is coupled to the support plate 190 at a pin assembly 200 and the piston rod 196 is coupled to the front application roller arm assembly 24. In one example, the piston rod 196 can be coupled to the front application roller arm assembly 24 at a block 202, which is disposed on the pin 86, as seen more clearly in FIG. 2. The pneumatic cylinder 194 also includes one or more connections or fittings 204 for receiving compressed air and control systems operatively coupled to the pneumatic cylinder to control actuation of the piston rod 196.

Figure 6:
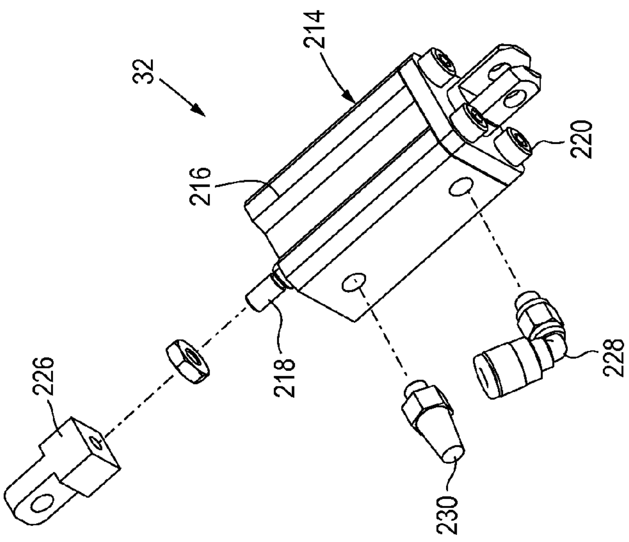
FIG. 6 is an exploded isometric view of an exemplary mechanism for reducing a biasing force on the cutting mechanism assembly.

The second mechanism 32 for reducing a biasing force is shown more clearly in FIGS. 1 and 6, and includes a support plate 210 that is coupled to the forward end portion 148 of the cutting mechanism support arm 140 by any suitable means, such as by nuts and screws 212. A second actuating element 214 is configured to be coupled to the support plate 210 and to the main mounting plate 22. In one example, the actuating element 214 is a pneumatic cylinder 216 that utilizes compressed air to drive a piston rod 218 to move in and out of the pneumatic cylinder. In the present example, a first end 220 of the pneumatic cylinder 216 is coupled to a pin 222 that extends generally transversely from the support plate 140 and the piston rod 218 is coupled to a pin 224 that extends generally transversely from the main mounting plate 22, as seen more clearly in FIG. 1. In one example, the piston rod 218 can be coupled to the pin 224 by a block 226. The pneumatic cylinder 216 also includes one or more connections or fittings 228 for receiving compressed air and control systems operatively coupled to the pneumatic cylinder to control actuation of the piston rod 218. The pneumatic cylinder 216 may also include a muffler 230 to reduce noise generated during actuation of the pneumatic cylinder.

Various modifications can be made to the first and second mechanisms 30, 32 without departing from the spirit and scope of the present disclosure, for example, the first and second actuating elements 192, 214 may be hydraulic cylinders or may be electrically actuated motors. Other contemplated modifications to the tape cartridge 22 may be found in Fox et al. U.S. Publication Nos. 2009/0217535, 2009/0218047, and 2009/0218048, each of which is commonly assigned with the present application and is hereby incorporated by reference in its entirety.

Figure 7:
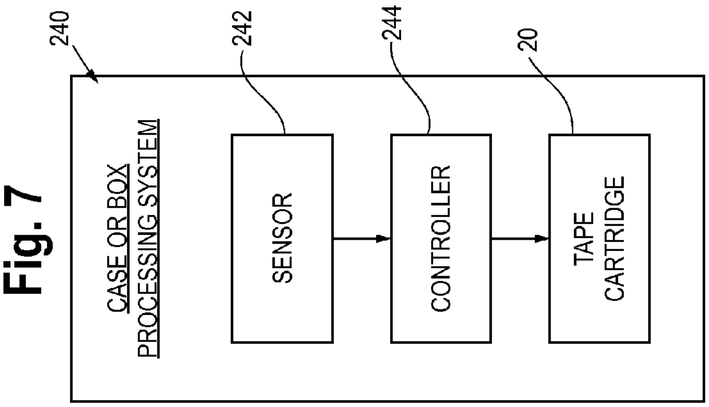
FIG. 7 is a block diagram of a case or box processing system that may incorporate the tape cartridge of FIG. 1.

FIG. 7 illustrates a block diagram of a case or box processing system 240 that includes a sensor 242, a controller 244, and a tape cartridge 20, such as the tape cartridge described hereinabove. The sensor 242, controller 244, and tape cartridge 20 may be operably coupled together to form the system 240 in any known manner and need not be physically connected together or integrated into a single unit. Rather, the components of FIG. 7 may be separate structures that communicate with each other in any known wired and/or wireless manner. In one example, the sensor 242, such as an optical sensor, a mechanical switch, a pressure sensor, etc., is configured to detect the presence of a case or box to be sealed and send a signal to the controller 244 that indicates the presence or absence of the case. The controller 244 can be any known controller or control system and incorporate microprocessors and other circuitry to process the signal from the sensor 242 and control the operation of the actuating elements 192, 214, as will be described in more detail hereinafter. For example, the controller may be operatively coupled to control a switch, such as a solenoid valve to allow compressed air to enter and/or exit the actuating elements 192, 214 to retract and/or extend the piston rods 196, 218.

Figure 8:
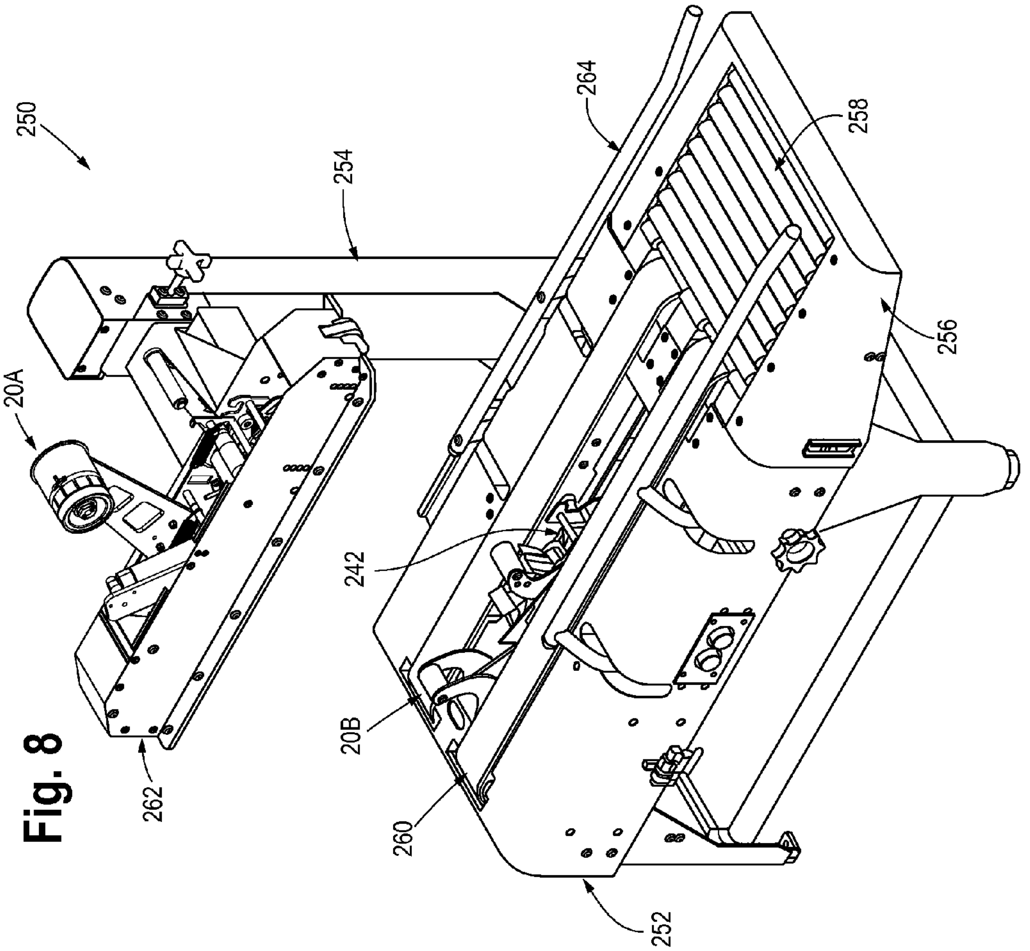
FIG. 8 is an isometric view of an exemplary case sealer system using the processing system of FIG. 7.

FIG. 8 illustrates one example of the system 240 of FIG. 7 in the form of a case sealer 250 that generally includes a frame assembly 252 and a mast assembly 254. Further, in the present example, the sensor 242 of FIG. 7 is coupled to the frame assembly 252. However, in other embodiments, the sensor 242 can be disposed anywhere with respect to the case sealer 250 to detect the presence of a case. A pack table 256 including a plurality of rollers 258 is coupled to the frame assembly 252. A bottom drive 260, which may include motor driven conveyer belts, is coupled to the frame assembly 252 and a top head assembly 262 is coupled to the mast assembly 254. The top head assembly 262 may include sensors, such as the sensor 242 or other sensors for sensing the box and/or a top drive similar to the bottom drive 260. Moveable side rails 264 are further coupled to the frame assembly 252 for centering a case in the case sealer 250. In the present embodiment, the case sealer 250 also includes a first tape cartridge 20A coupled to the top head assembly 262 to apply tape to a top surface of the box and a second tape cartridge 20B coupled to the frame assembly 252 to apply tape to a bottom surface of the box. However, in other embodiments, the case sealer 22 may include only one of the first and second tape cartridges 20A, 20B. The system 240 of FIG. 7 and the case sealer 250 of FIG. 8 may include additional or fewer components without departing from the spirit of the present disclosure. For example, the case sealer 250 may include folding mechanisms for folding down flaps or panels of the case or box.

The tape cartridge 20 can be controlled in the system 240 or case sealer 250 in a normal use mode, which is generally described hereinabove, or the first and/or second mechanisms 30, 32 can be utilized in a biasing force reduction mode. In the biasing force reduction mode, a case or box is conveyed towards the tape cartridge 20 and triggers the sensor 242, such as a photoelectric sensor, that detects the presence of the box. When the sensor 242 detects the box, an output signal is generated and sent to the controller 244 and the controller controls one or more of the actuating elements 192, 214 to counteract the force from the first and third biasing elements 100, 150 or reduce the force needed to load or deflect the biasing elements. Consequently, this minimizes the risk of the front tape application roller 24, the rear tape application roller 26, and/or the cutting mechanism assembly 28 pushing through or damaging the box when coming into contact therewith.

In one example, the controller 244 may control the first actuating element 192, for example, by energizing a solenoid valve that allows regulated compressed air to flow into the pneumatic cylinder 194, to retract the piston rod 196. The refraction of the piston rod 196 connected to the lower central portion 84 of the front application roller arm 50 begins to move the roller arm toward its end of movement position to counteract or reduce the force of the first biasing member 100. Consequently, the box is allowed to push the front application roller arm 50 toward the tape cartridge 20 and load the first biasing member 100 with minimal resistance.

When the sensor 242 is cleared by a trailing edge of the box, the sensor sends a corresponding output signal to the controller 244. In response, the controller 244 controls the first actuating element 192 to allow the full force of the first biasing member 100 to be applied to return the rear application roller arm 64 to its original or start position. In one example, the controller 244 deenergizes the solenoid valve that supplies compressed air to the pneumatic cylinder 194 and compressed air in the pneumatic cylinder is allowed to vent therefrom. Consequently, the piston rod 196 is allowed to extend and the full force of the first biasing member 100 is applied to drive the rear application arm 64 and roller 70 back to its original position and quickly and effectively wipe the tape against the rear surface of the box.

Further, when the sensor 242 detects the box, the controller 244 may control the second actuating element 214, for example, by energizing a solenoid valve that allows regulated compressed air to flow into the pneumatic cylinder 216, to extend the piston rod 218. The extension of the piston rod 218 connected to the forward end portion 148 of the cutting mechanism support arm 140 begins to move the support arm to its generally horizontal position to counteract or reduce the force of the third biasing member 150. Consequently, the box is allowed to push the cutting mechanism support arm 140 toward the tape cartridge 20 and load the third biasing member 150 with minimal resistance.

When the sensor 242 is cleared by a trailing edge of the box, the controller 244 may control the second actuating element 214, for example, by deenergizing the solenoid valve that supplies compressed air to the pneumatic cylinder 216 and allowing compressed air in the pneumatic cylinder to vent therefrom. Consequently, the piston rod 218 is allowed to retract and the full force of the third biasing member 150 is applied to drive the cutting mechanism support arm 140 back to its original position and the cutting mechanism 162 swings downward to sever the tape in a consistent manner.

The first and second mechanisms 30, 32 may be used in conjunction or alternatively to one another. Consequently, the present disclosure contemplates embodiments wherein one or the other of the first and second mechanisms is removed from the tape cartridge.

In the present disclosure, the words "a" or "an" are to be taken to include both the singular and the plural. Conversely, any reference to plural items shall, where appropriate, include the singular.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the present disclosure are reserved.

The invention claimed is:

1. A cutting mechanism assembly for use with a tape cartridge, comprising:

a support arm having first and second opposing ends and adapted to be coupled to the tape cartridge;

a mount for a biasing element, wherein the mount is coupled to the support arm and the biasing element is configured to couple the mount to the tape cartridge;

a support plate for a cylinder for reducing a biasing force from the biasing element, wherein the support plate is coupled to the support arm and fixed against movement relative to the support arm, and the cylinder is configured to couple the support plate to the tape cartridge; and a mounting plate coupled to the support arm and a cutting mechanism mounted upon the mounting plate, wherein the mount and the support plate are generally coupled to the support arm proximate the first end thereof and the mounting plate is generally coupled to the support, arm proximate the second end thereof.

2. The cutting mechanism assembly of claim 1, wherein the mount is a pin extending from the support arm, and the biasing element is a spring.

3. The cutting mechanism assembly of claim 1, further including a sealing tape adjustment mechanism coupled to the support arm and a cutting mechanism guard coupled to the mounting plate.

4. The cutting mechanism assembly of claim 1, wherein the support arm is adapted to be pivotally coupled to the tape cartridge.

5. The cutting mechanism assembly of claim 1, wherein the cylinder for reducing a biasing force is an actuating element with a movable arm, and wherein the actuating element is controlled to extend the movable arm to reduce the biasing force from the biasing element.

6. The cutting mechanism assembly of claim 5, wherein the actuating element is a pneumatic cylinder and the movable arm is a piston rod extending from the pneumatic cylinder.

7. A tape cartridge, comprising:

a mounting plate;

a cutting mechanism assembly that includes a support arm movably coupled to the mounting plate and a cutting mechanism coupled to the support arm, a biasing element coupled between the support arm and the mounting plate, and a support plate for a cylinder for reducing a biasing force from the biasing element, wherein the support plate is coupled to the support arm and fixed against movement relative to the support arm, and wherein the cylinder for reducing a biasing force is coupled between the support plate and the mounting plate; and a front application roller arm assembly coupled to the mounting plate and a rear application roller arm assembly coupled to the mounting plate.

8. The tape cartridge of claim 7, wherein the front and rear application roller arm assemblies include front and rear application rollers, respectively.

9. The tape cartridge of claim 7, further comprising a tape core assembly mounted to the mounting plate and adapted to retain a roll of sealing tape, and a tension roller assembly coupled to the mounting plate and adapted to route a leading end tab portion of the sealing tape to the front application roller arm assembly.

10. The tape cartridge of claim 7, further comprising a link bar connected between the front application roller arm assembly and the rear application roller arm assembly, and a second biasing element coupled between the rear application roller arm assembly and the mounting plate.

11. The tape cartridge of claim 10, further comprising a second cylinder for reducing a biasing force from the second biasing element, wherein the second cylinder for reducing a biasing force is coupled between the front application roller arm assembly and the mounting plate.

12. The tape cartridge of claim 11, wherein the second cylinder for reducing a biasing force is an actuating element with a movable aim, and wherein the actuating element is controlled to retract the movable arm to reduce the biasing force from the biasing element.

13. The cutting mechanism of claim 12, wherein the actuating element is a pneumatic cylinder and the movable arm is a piston rod extending from the pneumatic cylinder.

14. A case processing system, comprising:

a sensor for detecting the presence of a case to be sealed;

a controller coupled to the sensor; and a tape cartridge coupled to the controller, wherein the tape cartridge includes a mounting plate, a cutting mechanism assembly having a support arm movably coupled to the mounting plate and a cutting mechanism coupled to the support arm, a biasing element coupled between the support arm and the mounting plate for biasing the cutting mechanism assembly to a first position, a support plate for a cylinder for reducing a biasing force from the biasing element, wherein the support plate is coupled to the support arm and fixed against movement relative to the support arm, and wherein the cylinder is coupled between the support plate and the mounting plate, a front application roller arm assembly and a rear application roller arm assembly, wherein, in response to the sensor detecting the case, the controller actuates the cylinder to reduce the biasing force from the biasing element, and in response to the sensor no longer detecting the case, the controller de-actuates the cylinder to allow the biasing force to return the cutting mechanism assembly to the first position.

15. The case processing system of claim 14, wherein the cylinder for reducing a biasing force is an actuating element with a movable arm, and wherein the controller actuates the actuating element to extend the arm to reduce the biasing force from the biasing element.

16. The case processing system of claim 15, wherein the actuating element is a pneumatic cylinder and the movable arm is a piston rod extending from the pneumatic cylinder.

17. The case processing system of claim 14, further including a mast assembly disposed around a frame assembly, and wherein the tape cartridge is coupled to the mast assembly.

* * * * *